United States Patent
Krause et al.

(10) Patent No.: US 9,683,629 B2
(45) Date of Patent: Jun. 20, 2017

(54) CENTRIFUGAL FORCE PENDULUM

(71) Applicant: Schaeffler Technologies GmbH & Co. KG, Herzogenaurach (DE)

(72) Inventors: Thorsten Krause, Buehl (DE); Kai Schenck, Offenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/410,904

(22) PCT Filed: Jun. 26, 2013

(86) PCT No.: PCT/EP2013/063394
§ 371 (c)(1),
(2) Date: Dec. 23, 2014

(87) PCT Pub. No.: WO2014/005902
PCT Pub. Date: Jan. 9, 2014

(65) Prior Publication Data
US 2015/0152940 A1    Jun. 4, 2015

(30) Foreign Application Priority Data
Jul. 6, 2012   (DE) .................. 10 2012 211 868

(51) Int. Cl.
*F16F 15/14*    (2006.01)
*F16F 15/31*    (2006.01)

(52) U.S. Cl.
CPC ............ *F16F 15/145* (2013.01); *F16F 15/31* (2013.01); *Y10T 74/2128* (2015.01)

(58) Field of Classification Search
CPC ........ F16F 15/145; F16F 15/315; F16F 15/31; F16F 15/14; F16H 2045/0263; Y10T 74/2184
See application file for complete search history.

(56) References Cited

U.S. PATENT DOCUMENTS 3,874,818 A * 4/1975 Saunders .............. B64C 27/001
                                                           416/144
5,884,735 A * 3/1999 Eckel .................... F16F 15/145
                                                           188/378

FOREIGN PATENT DOCUMENTS

| DE | 102006028556 | 1/2007 |
| DE | 102006028552 | 5/2007 |
| DE | 102011013232 | 9/2011 |
| WO | 2012/089190 | 7/2012 |

* cited by examiner

*Primary Examiner* — Thomas Diaz
(74) *Attorney, Agent, or Firm* — Simpson & Simpson, PLLC

(57) ABSTRACT

A centrifugal force pendulum having a pendulum mass pair and a pendulum flange, in which an arcuate cut-out with a cut-out contour is provided, wherein the pendulum masses of the pendulum mass pair are situated on both sides of the pendulum flange and are connected to each other by at least one spacer bolt which is guided through the cut-out, wherein the spacer bolt has a damping arrangement which includes a stabilizing element and an elastic damping element, wherein the damping element is designed to damp a striking of the spacer bolt on the cut-out contour of the cut-out, wherein the damping element and the stabilizing element of the damping arrangement are positioned relative to each other so that the damping element is able to strike the cut-out contour of the cut-out directly.

11 Claims, 5 Drawing Sheets

CENTRIFUGAL FORCE PENDULUM

CROSS-REFERENCE TO RELATED APPLICATIONS

The present application is the U.S. national stage application pursuant to 35 U.S.C. §371 of International Application No. PCT/EP2013/063394, filed on Jun. 26, 2013, which application claims priority from German Patent Application No. DE 10 2012 211 868.3, filed on Jul. 6, 2012, which applications are incorporated herein by reference in their entireties.

TECHNICAL FIELD

The invention generally relates to a centrifugal force pendulum having a pair of pendulum masses and a pendulum flange, in which an arcuate cut-out having a cut-out contour is provided, the pendulum masses of the pendulum mass pair being situated on both sides of the pendulum flange and being connected to one another by at least one spacer bolt guided through the cut-out. The spacer bolt has a damping arrangement which comprises a stabilizing element and an elastic damping element, the damping element being designed to damp the striking of the spacer bolt on the cut-out contour of the cut-out.

BACKGROUND

From German Patent No. DE 10 2011 013 232 A1, a centrifugal force pendulum is known having a pendulum flange and pendulum masses fastened on both sides of the pendulum flange by means of a spacer bolt received in an arcuate cut-out of the pendulum flange, a movement of the pendulum mass pair being limited by means of a stop. The spacer bolt here has a damping arrangement, which comprises a damping element and a ring which encircles the damping element. The ring is designed to strike a cut-out contour of the cut-out. Due to the metal material combination of ring and pendulum flange, the striking of the ring on the cut-out contour of the pendulum flange results in a clearly perceptible generation of noise; furthermore, metal particles may become detached in the process.

SUMMARY

A centrifugal force pendulum having a pendulum flange (38) including an arcuate cut-out (44) with a cut-out contour (46), a pendulum mass pair (34) having a first pendulum mass and a second pendulum mass disposed on both axial sides of the pendulum flange and connected to each other with a spacer bolt extending through the cut-out, a damping arrangement including a stabilizing element (64; 86), and, an elastic damping element (66; 72, 78; 84) wherein the damping element (66; 78; 84) and the stabilizing element (64; 86) are arranged so that when the spacer bolt (40; 69; 80) strikes the cut-out contour (46) of the cut-out (44) the damping element (66; 78; 84) comes into direct contact with the cut-out contour (46) of the cut-out (44).

The object of the invention is to increase the wear-resistance of the centrifugal force pendulum, while at the same time reducing noise emissions.

Accordingly, a centrifugal force pendulum is supplied, having a pair of pendulum masses and a pendulum flange in which an arcuate cut-out having a cut-out contour is provided. The pendulum masses of the pendulum mass pair are situated on both sides of the pendulum mass flange, and are connected to each other by at least one spacer bolt guided through the cut-out. The spacer bolt has a damping arrangement, which comprises a stabilizing element and an elastic damping element. The damping arrangement is designed to damp the striking of the spacer bolt on the cut-out contour. In this case, the damping element and the stabilizing element of the damping arrangement are positioned relative to each other so that only the damping element makes direct contact with the cut-out contour of the cut-out when the spacer bolt strikes the cut-out contour of the cut-out.

This has the advantage of reducing the wear on the cut-out and on the spacer bolt, which means that the shape of the cut-out is not changed over the long term, therefore guaranteeing the long-term stable behavior of the spring pendulum. It also prevents possibly-abraded particles from being introduced into an oil circuit of a vehicle transmission in the event of a metal-to-metal combination of the spacer bolt of the pendulum flange. At the same time, the stabilizing element ensures that the damping element does not fragment and release particles from the damping element. Furthermore, noise emissions, in particular striking noises, are reduced.

In an example embodiment, the spacer bolt comprises a spacer bolt body, the stabilizing element being situated between the damping element and the spacer bolt body. This prevents the stabilizing element on the cut-out contour from being struck.

In an example embodiment, the spacer bolt has a spacer bolt body, an additional damping element being situated between a circumferential surface of the spacer bolt body and the stabilizing element, so that the damping behavior is flexibly adjustable by means of the additional damping element.

In an example embodiment, the damping element and the additional damping element each have a different firmness, in particular if the damping element has a greater firmness than the additional damping element.

In an example embodiment, the spacer bolt includes a spacer bolt body, wherein the damping element is situated on a circumferential surface of the spacer bolt body, and the stabilizing element is situated on a face of the damping element. In this way, the shaping and the damping behavior can be influenced advantageously by the arrangement of the stabilizing element on the face, thus preventing a breaking off or cracking of the damping element on the face.

In an example embodiment, a stabilizing element is provided on each face of the damping element, so that the damping element is delimited axially by the stabilizing elements.

In an example embodiment, the damping element is of a ring-shaped design, the damping element having essentially a rectangular cross section. This rectangular design has proven especially advantageous for controlled striking of the spacer bolt on the cut-out contour of the cut-out.

In an example embodiment, the stabilizing element has a smaller outside diameter than the damping element. In this way, the stabilizing element is reliably prevented from striking the pendulum flange or the cut-out contour.

In an example embodiment, the stabilizing element is designed as a completely closed ring, a lateral face of the stabilizing element at which the stabilizing element is in contact with the damping elements being oriented essentially parallel or perpendicular to a longitudinal axis of the spacer bolt. This arrangement makes it easier to mount the stabilizing element on the spacer bolt.

In an example embodiment, the stabilizing element has a firmness which is greater than the firmness of the damping element.

These and other objects, advantages and features of the present invention will be better appreciated by those having ordinary skill in the art in view of the following detailed description of the invention in view of the drawings.

BRIEF DESCRIPTION OF THE DRAWINGS

Various embodiments are disclosed, by way of example only, with reference to the accompanying drawings. Like components are named with the same reference labels. The figures show the following details.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
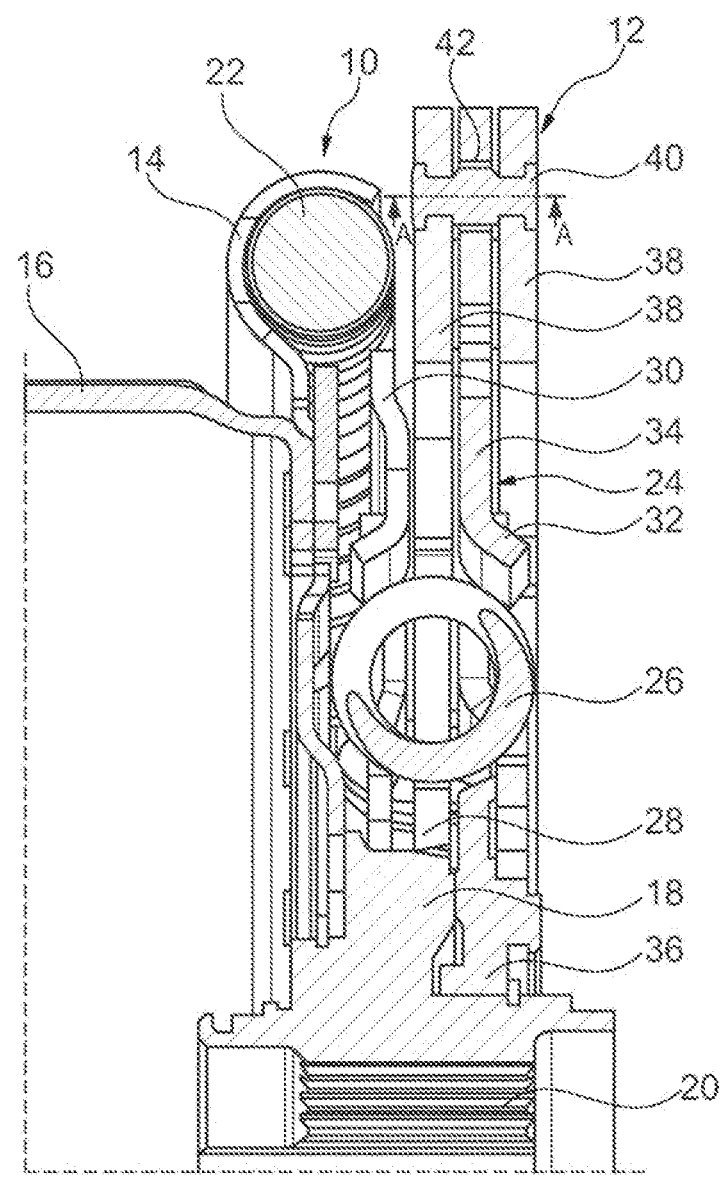
FIG. 1 is a cross-sectional view of a torsional vibration damper having a centrifugal force pendulum according to the present invention fixed in place.

FIG. 1 is a cross-sectional view of torsional guidance damper 10 having centrifugal force pendulum 12. On damper input part 14 of torsional vibration damper 10, designed as a series damper, plate carrier 16 is configured to function as a clutch output of a clutch device. The clutch device may be designed, for example, as a torque converter lockup clutch, or as a wet clutch. Torsional vibration damper 10 is effectively connected between the clutch output and output hub 18. Toothing 20 connects output hub 18 connected to a transmission input shaft of a transmission in a drivetrain of a motor vehicle.

Damper input part 14 rotates around first energy storage elements 22 and is connected to output hub 18 so that it is centered and axially secured. First energy storage elements 22 effectively connect damper input part 14 to damper intermediate part 24. In an example embodiment, first energy storage elements 22 are bow springs. Damper intermediate part 24 rotates to a limited degree relative to damper input part 14. Damper intermediate part 24, in turn, rotates to a limited degree relative to damper output part 28 through the action of second energy storage elements 26, for example compression springs, which are located radially inward with respect to first energy storage elements 22. Damper output part 28 is non-rotatably connected to output hub 18, for example through a welded connection.

Damper intermediate part 24 consists of two plate pieces 30 and 32 axially displaced from one another with plate piece 30 on one axial side of damper part 28 and plate 32 on the other axial side of damper part 28. Plate piece 32 is elongated and radially extends outward to form pendulum flange 34. Pendulum flange 34 is integrated into plate piece 32, but may also be attached to the latter as a separate component. Pendulum flange 34 is a part of centrifugal force pendulum 12. Plate piece 32 is non-rotatably connected to turbine hub 36, which is designed to link a turbine wheel of a hydrodynamic torque converter. Turbine hub 36 is centered on output hub 18 and is rotatable with respect to output hub 18.

Pendulum masses 38 are axially displaced from one another with pendulum flange 12 disposed axially between them. Spacer bolt 40 extends through pendulum flange 34 through arcuate cut-out 42, and connects pendulum masses 38 to each other.

Figure 2:
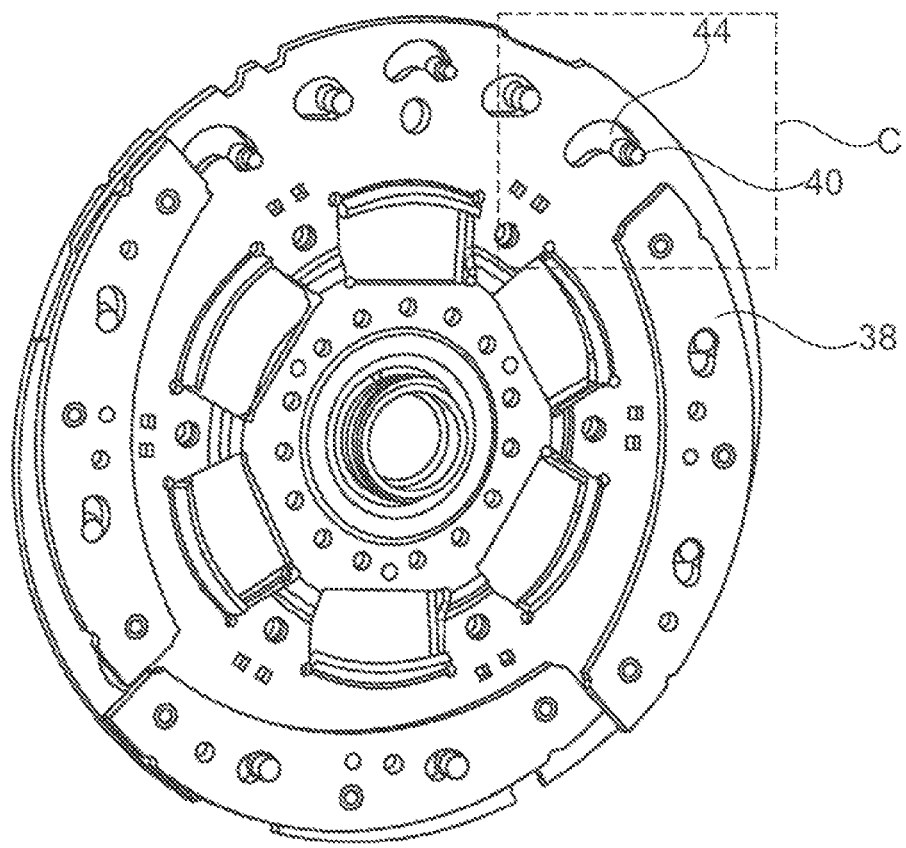
FIG. 2 is a perspective view of a centrifugal force pendulum according to the present invention.
Figure 3:
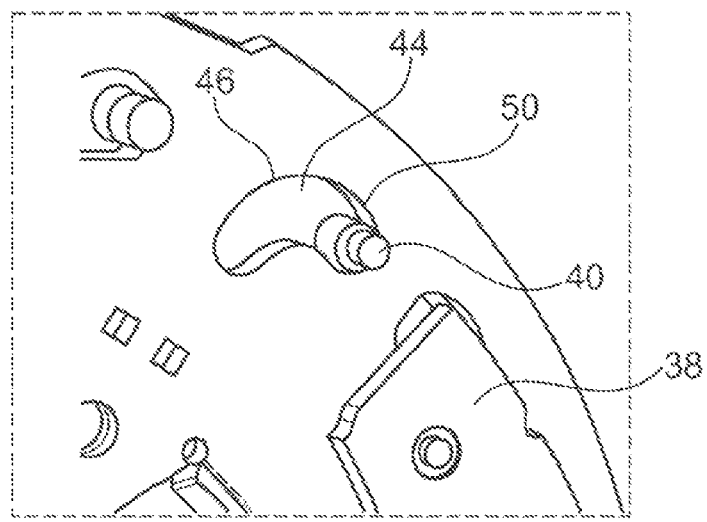
FIG. 3 is a magnified view of a detail of the centrifugal force pendulum shown in FIG. 2.

FIG. 2 shows a perspective view of centrifugal force pendulum 12, and FIG. 3 shows a detail of centrifugal force pendulum 12 in area C shown in FIG. 2. For better clarity, not all pendulum masses 38 are depicted in FIGS. 2 and 3. As explained above, spacer bolt 40 reaches through arcuate cut-out 44 and connects pendulum masses 38 (which are positioned on both sides of the pendulum flange 34) to each other. In the example embodiment shown in FIG. 3, cut-out 44 has an arcuate cut-out contour 46, which delimits clearance of spacer bolt 40 by a striking of outer circumferential surface 50 of spacer bolt 40 on cut-out contour 46.

Figure 4:
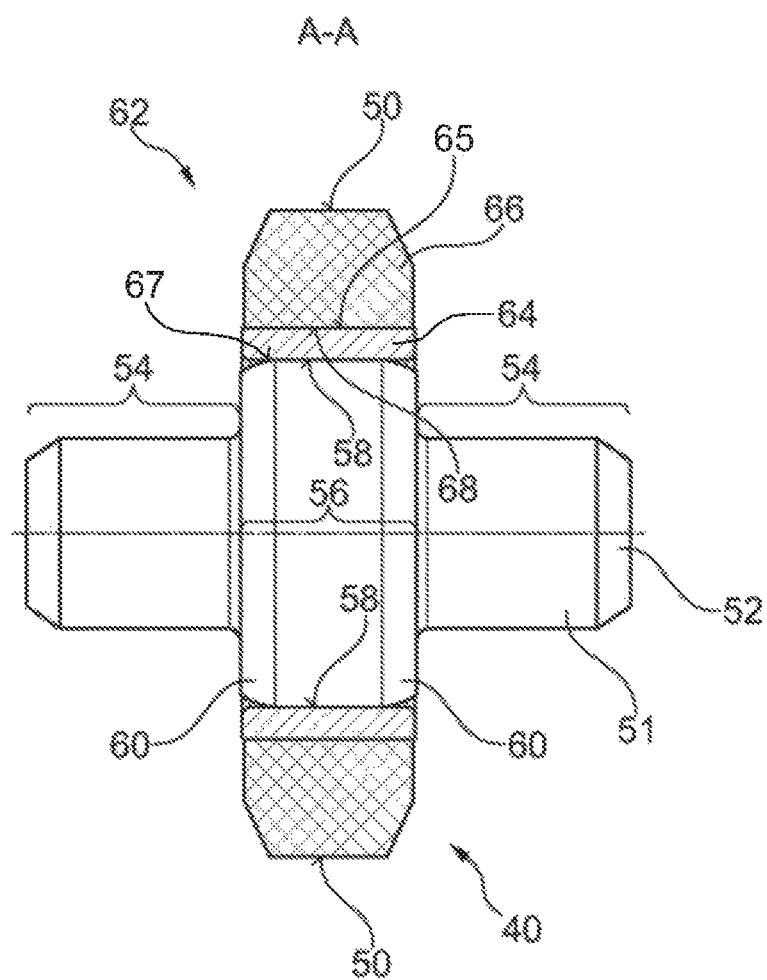
FIG. 4 illustrates an exemplary embodiment of a spacer bolt of a centrifugal force pendulum according to the present invention.

FIG. 4 shows a sectional view through spacer bolt 40 according to a first embodiment, shown in FIGS. 1 through 3. The section is taken along cutting line A-A shown in FIG. 1. Spacer bolt 40 has a rotationally symmetrical spacer bolt body 51 with longitudinal axis 52, which may also be an axis of rotation of spacer bolt 40, depending on how spacer bolt 40 is fastened to pendulum masses 38. Spacer bolt body 51 has two fastening zones 54, at which spacer bolt body 51 is connected to pendulum masses 38. Stop region 56 is situated between fastening zones 54. Stop region 56 has a greater diameter than fastening zones 54, which are adjacent to stop region 56 to the right and left in FIG. 4. In stop region 56 spacer bolt body 51 has circumferential surface 58, which is cylindrical in form and on each of whose lateral edges toward fastening zone 54 chamfer 60 is situated. Radially outward of circumferential surface 58 of spacer bolt body 51, is damping arrangement 62 according to a first embodiment. Damping arrangement 62 comprises stabilizing element 64 situated on the circumferential surface 58 of spacer bolt body 51, and damping element 66 situated radially outward of stabilizing element 64. Both damping element 66 and stabilizing element 64 are ring-shaped, and have the same axial extent (in the direction of the longitudinal axis 52) as stop region 56. Inner circumferential surface 67 of stabilizing element 64 rests against circumferential surface 58 of spacer body 51. Damping element 66 rests against outer circumferential surface 68 of stabilizing element 64. Damping arrangement 62 is designed so that outer circumferential surface 50 of spacer bolt 40, which is formed by a circumferential surface of ring-shaped damping element 66, damps the motion of pendulum masses 38 when outer circumferential surface 50 directly strikes cut-out contour 46 of cut-out 44. In an example embodiment, damping element 66 exclusively strikes cut-out contour 46 of cut-out 44. Only damping element 66 comes into direct contact with cut-out contour 46. Because of the lesser firmness of damping element 66 compared to the firmness of stabilizing element 64 and the firmness of pendulum flange 34, when the striking occurs the kinetic energy is almost completely converted to heat in damping element 66, and the noise emissions are significantly reduced. In the non-loaded state, damping element 66 re-forms into its original condition, so that damping element 66 is then essentially cylindrical again.

In addition, the damping behavior of damping element 66 is influenced advantageously by stabilizing element 64, since because of the broad bearing surface on circumferential surface 68 of stabilizing element 64 located radially on the outside, there can be a good introduction of force from damping element 66 into stabilizing element 64 and from stabilizing element 64 into spacer bolt body 51. Furthermore, damping element 66 together with stabilizing element 64 can easily be pushed onto circumferential surface 58 of spacer bolt body 51. In addition, the forces which arise during the striking are cushioned better in damping element 66. That also enables the wear or the long-term stability of damping arrangement 62 to be improved. This is achieved in particular by stabilizing element 64 being almost completely surrounded by spacer bolt body 51 or damping element 66. Furthermore, the stiffness of damping arrangement 62 is increased by stabilizing element 64.

Figure 5:
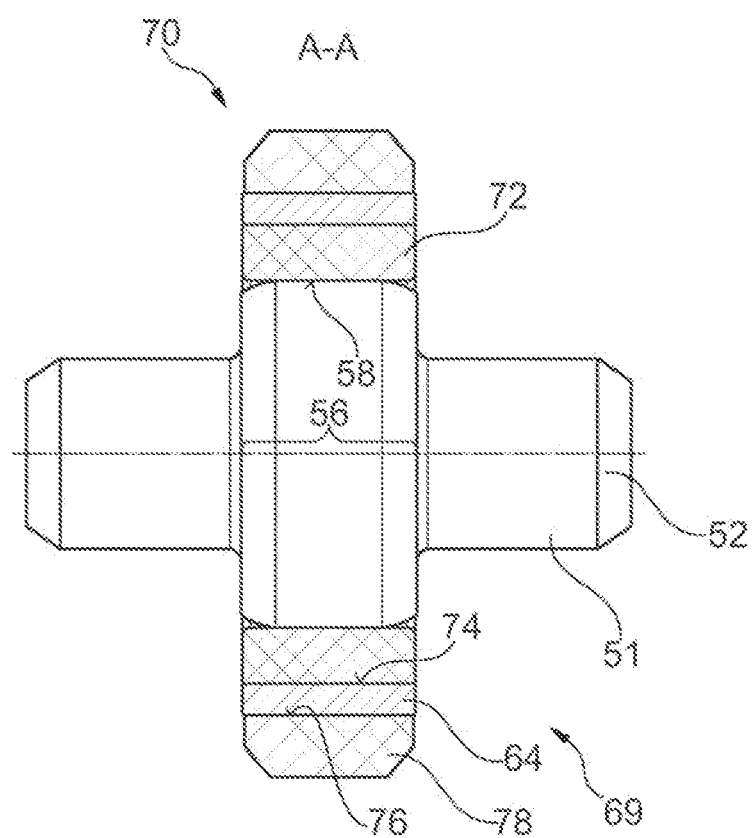
FIG. 5 illustrates an exemplary embodiment of a centrifugal force pendulum according to the present invention; and, FIG. 6 illustrates an exemplary embodiment of a spacer bolt of a centrifugal force pendulum according to the present invention.

FIG. 5 shows a second embodiment of spacer bolt 69 with a second embodiment of damping arrangement 70. Spacer bolt 69 includes spacer bolt body 51 explained in FIG. 4. Damping arrangement 70 situated radially on the outside of circumferential surface 58 of spacer bolt body 51 has first damping element 72 positioned on circumferential surface 58 of spacer bolt body 51, which is ring-shaped and has a rectangular cross section. First damping element 72 completely surrounds stop region 56 of spacer bolt body 51, and has the same axial extension in the direction of longitudinal axis 52 as stop region 56. Situated radially on the outside of outer circumferential surface 74 of first damping element 72 is stabilizing element 64 explained in FIG. 4. However, stabilizing element 64 has an enlarged diameter compared to FIG. 4. Furthermore, first damping element 72 and stabilizing element 64 have the same axial extension in the direction of longitudinal axis 52, but have different firmnesses, the firmness of stabilizing element 64 being greater in this embodiment than the firmness of the first damping element 72.

Located radially on the outside on circumferential surface 76 of stabilizing element 64 is second damping element 78, so that stabilizing element 64 is almost completely surrounded (with the exception of axial faces) by two damping elements 72, 78. The second damping element in this case has the same axial extension as stabilizing element 64 or first damping element 72. Second damping element 78 also has a rectangular cross section and is ring-shaped. Second damping element 78 in this case has a different firmness than first damping element 72 or stabilizing element 64. The firmness is preferably less than that of first damping element 72, and less than the firmness of stabilizing element 64. This form is especially sturdy, and has especially good damping behavior. The opposite case is also conceivable, in which first damping element 72 has a lesser firmness than second damping element 78. The firmness of damping elements 72, 78 may also be essentially the same.

An area cross-section of first damping element 72 is essentially identical to the area cross section of second damping element 78. However, the area cross section of stabilizing element 64 is essentially half the size of the area cross section of first or second damping element 72, 78. Through the centered positioning of stabilizing element 64, a long-term stable damping arrangement 70 can be provided for spacer bolt 40. Furthermore, through the different choice of material for damping elements 72, 78 and stabilizing element 64, damping arrangement 70 can be provided which can be adapted flexibly to the differing striking conditions, including in particular to the differing masses of pendulum masses 38.

In FIGS. 4 and 5, the respective circumferential surfaces 68, 76 of stabilizing element 64 which are turned toward damping element 72, 78, 66 or are in contact with damping element 72, 78, 66 are aligned parallel to longitudinal axis 52 or axis of rotation of spacer bolt 40, 69. This enables simple assembly and production of damping arrangement 62, 70 on spacer bolt 40, 69.

Figure 6:
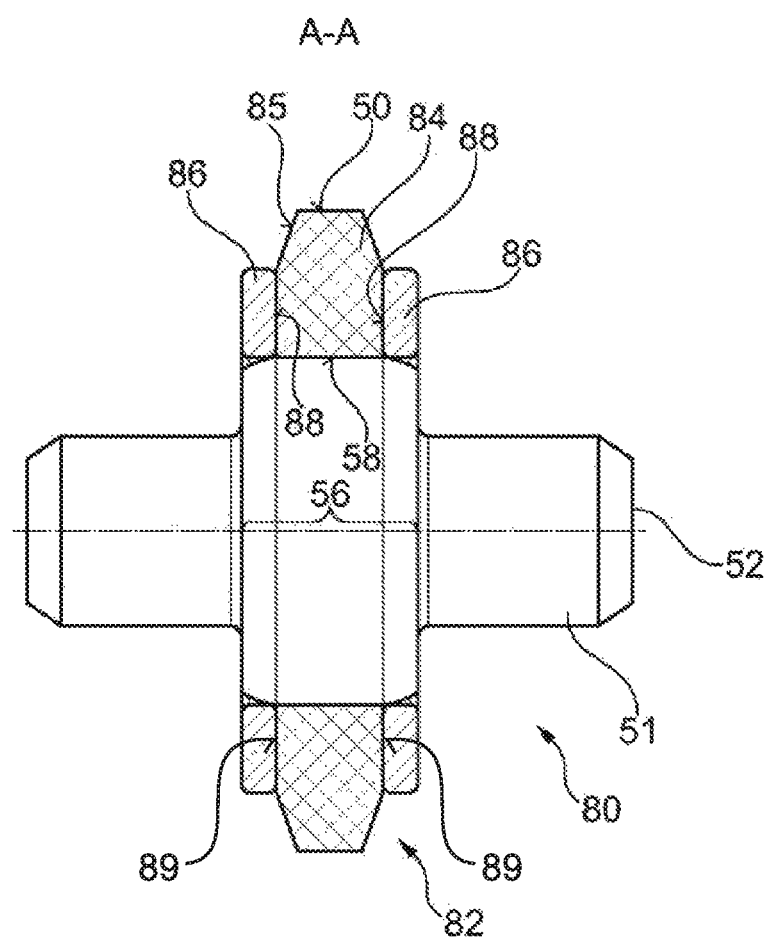

FIG. 6 shows a third embodiment of a spacer bolt 80 with a third embodiment of damping arrangement 82. Spacer bolt 80 includes spacer bolt body 51 explained in FIG. 4. Damping arrangement 82 of spacer bolt 80 includes ring-shaped damping element 84, which is situated on circumferential surface 58 of spacer bolt body 51. Damping element 84 has an essentially rectangular cross section, while chamfers 85 are provided on outer circumferential surface 50. Damping element 84 is delimited laterally in the axial direction in each case by stabilizing element 86. Stabilizing element 86 is positioned in direct contact here with relevant face 88 of damping element 84. Face 88 or face 89 of stabilizing element 86 here designates the side surfaces of damping element 84 or of stabilizing element 86, which are positioned vertically in the axial direction of longitudinal axis 52. To simplify assembly, faces 88 of damping element 84 or face 89 of stabilizing element 86 are aligned perpendicular to longitudinal axis 52 of spacer bolt 80. Stabilizing element 86, like the stabilizing elements shown in FIGS. 4 and 5, has a smaller outside diameter than damping element 84. This reliably prevents stabilizing elements 86 from striking pendulum flange 38 or cut-out contour 46 of cut-out 44, so that the stop contact is made exclusively by damping element 84 on cut-out contour 46 of pendulum flange 38. Through the lateral delimitation of damping element 84 by the respective laterally positioned stabilizing element 86, a lateral avoidance of damping element 84 is prevented when outer circumferential surface 50 strikes cut-out contour 46 of the pendulum flange 80. This prevents possible break-up and cracking of damping element 84, so that spacer bolt 80 is more durable than known spacer bolts. Furthermore, the striking noises are significantly reduced.

The lateral delimitation of the damping element also increases the firmness of damping arrangement 82, and thus also influences the damping characteristic of damping arrangement 82. The damping characteristic or the firmness of damping arrangement 82 can be varied simply by changing the outside diameter of stabilizing element 86. This provides an easily adaptable damping arrangement 82.

The firmnesses of damping arrangements 62, 70, 82 can be varied, for example, by damping element 66, 72, 78, 84 having an appropriate elastic material, in particular rubber. Alternatively, the firmness can also be varied by the geometry of damping element 66, 72, 78, 84 or of stabilizing element 64, 86 being adapted to the desired firmness. This can be accomplished in particular by damping element 66, 72, 78, 84 having a recess and/or a cavity and/or a bore and/or a foam-like structure to configure the firmness.

It is of course also conceivable, instead of stabilizing elements 86 shown in FIG. 6, to provide only one stabilizing element 86, which is either situated on one of the two faces 88 of damping element 84, or alternatively is completely surrounded by damping element 84. It is also pointed out that stabilizing elements 86 and damping element 84 have the same inside diameter, which is chosen so that damping element 84 and stabilizing elements 86 can be attached to circumferential surface 58 of spacer bolt body 51 by means of a clearance fit.

The attachment by means of the clearance fit is also suitable for damping arrangements 62, 70 of spacer bolt 40 or 69 shown in FIGS. 4 and 5. The clearance fit ensures that damping arrangement 62, 70, 82 is easily rotatable on spacer bolt body 51. To secure damping arrangement 62, 70, 82 axially, it is fixed in the assembled state in stop region 56 of spacer bolt body 51 by the laterally positioned pendulum masses 38. Through the easily rotatable damping arrangement, damping arrangement 62, 70, 82 is loaded uniformly over the circumference for the entire life of spacer bolt 40, 69, 80, so that the wear and tear also occurs uniformly over the circumference of spacer bolt 40, 69, 80. In this way, an especially long-term stable centrifugal force pendulum 12 can be provided.

Damping elements 66, 72, 78, 84 can be connected to stabilizing element 64, 86 by means of vulcanizing, or some other positive and materially bonded connection. If damping element 66, 72, 78, 84 is connected to stabilizing element 64, 86 by means of vulcanizing, this has the advantage that, in this case, a compressive stress or internal stress can be built up in damping element 66, 72, 78, 84 during vulcanizing, which is preserved after the vulcanizing process. The introduced internal stress has the result that when damping element 66, 72, 78, 84 strikes cut-out contour 46 of cut-out 44 directly, the internal stress is oriented contrary to the introduced striking force or to striking stress induced thereby and the striking stress is at least partially compensated for by the internal stress, so that a dynamic damping capability and an effective stiffness of damping arrangement 62, 70, 82 are increased. In this way, damping element 66, 72, 78, 84 or damping arrangement 62, 70, 82 can be subjected to a higher striking stress or thereby has an increased service life. The assembly reliability of damping arrangement 62, 70, 82 on spacer bolt body 51 is also improved. The same connecting options are also conceivable for stabilizing elements 64, 86 or for damping elements 66, 72, 78, 84 to spacer bolt body 51, in particular if the latter is rotatably connected to pendulum masses 38.

In FIGS. 4 through 6, stabilizing elements 64, 86 and damping elements 66, 72, 78, 84 are formed with a rectangular cross section. Other cross sections are also conceivable of course, such as circular, elliptical or polygonal. The ratio of the area cross sections of damping elements 66, 72, 78, 84 and stabilizing elements 64, 86 is also freely adjustable in the combinations shown.

As an alternative to damping arrangements 62, 70, 82 shown in FIGS. 4 through 6, however, other damping arrangements are also conceivable. It is essential, however, that stabilizing element 64, 86 is positioned relative to damping element 66, 78, 84 so that when spacer bolt 40, 69, 84 strikes cut-out contour 46 of cut-out 44, exclusively the damping element comes into direct contact with cut-out contour 46 of the cut-out 44.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Torsional vibration damper
12 Centrifugal force pendulum
14 Damper input part
16 Plate carrier
18 Output hub
20 Toothing
22 First energy storage elements
24 Damper intermediate part
26 Second energy storage elements
28 Damper output part
30 Plate piece
32 Plate piece
34 Pendulum flange
36 Turbine hub
38 Pendulum mass
40 Spacer bolt (first embodiment)
44 Bow-shaped cut-out
46 Cut-out contour
50 Outer circumferential surface of the spacer bolt
51 Spacer bolt body
52 Longitudinal axis of the spacer bolt body
54 Fastening zones
56 Stop region
58 Circumferential surface of the spacer bolt body
60 Chamfer
62 Damping arrangement (first embodiment)
64 Stabilizing element
65 Inner circumferential surface of the damping element
66 Damping element
67 Inner circumferential surface of the stabilizing element
68 Outer circumferential surface of the stabilizing element
69 Spacer bolt (second embodiment)
70 Damping arrangement (second embodiment)
72 First damping element
74 Outer circumferential surface of the first damping element
76 Outer circumferential surface of the stabilizing element
78 Second damping element
80 Spacer bolt (third embodiment)
82 Damping arrangement (third embodiment)
84 Damping element
85 Chamfers
86 Stabilizing element
88 Face
89 Face

What is claimed is:

1. A centrifugal force pendulum, comprising:
    a pendulum flange having an arcuate cut-out with a cut-out contour;
    a pendulum mass pair having a first pendulum mass and a second pendulum mass disposed on both axial sides of the pendulum flange and connected to each other with a spacer bolt extending through the cut-out;
    a damping arrangement including:
        a stabilizing element, arranged concentrically around the spacer bolt; and, an elastic damping element, arranged concentrically around the spacer bolt;

wherein the elastic damping element and the stabilizing element are arranged so that when the spacer bolt strikes the cut-out contour of the cut-out the elastic damping element comes into direct contact with the cut-out contour of the cut-out.

2. The centrifugal force pendulum of claim 1, wherein the spacer bolt includes a spacer bolt body, the stabilizing element is arranged between the damping element and the spacer bolt body.

3. The centrifugal force pendulum of claim 2, wherein an additional damping element is situated between the spacer bolt body and the stabilizing element.

4. The centrifugal force pendulum of claim 3, wherein the damping element has a first firmness which is greater than a second firmness of the additional damping element.

5. The centrifugal force pendulum of claim 1, wherein the spacer bolt includes a spacer bolt body, wherein the damping element is arranged on a circumferential surface of the spacer bolt body, and the stabilizing element is arranged on a face of the elastic damping element.

6. The centrifugal force pendulum of claim 1, wherein the stabilizing element is provided on a face of the elastic damping element, so that the elastic damping element is delimited axially by the stabilizing element.

7. The centrifugal force pendulum of claim 1, wherein the elastic damping element is ring-shaped and has a rectangular cross-section.

8. The centrifugal force pendulum of claim 1, wherein the stabilizing element has a smaller outside diameter than the elastic damping element.

9. The centrifugal force pendulum of claim 1, wherein the stabilizing element is designed as a completely closed ring, wherein a lateral face of the stabilizing element, on which the stabilizing element is in contact with the elastic damping element, is aligned parallel or perpendicular to a longitudinal axis of the spacer bolt.

10. The centrifugal force pendulum of claim 1, wherein the stabilizing element has a first firmness which is greater than a second firmness of the elastic damping element.

11. A centrifugal force pendulum, comprising:
a pendulum flange having an arcuate cut-out with a cut-out contour;
a pendulum mass pair having a first pendulum mass and a second pendulum mass disposed on both axial sides of the pendulum flange and connected to each other with a spacer bolt extending through the cut-out;
a damping arrangement including:
a stabilizing element having a first diameter and arranged concentrically around the spacer bolt;
a first elastic damping element having a second diameter, the first elastic damping element arranged concentrically around the spacer bolt and axially adjacent to the stabilizing element on a first axial side; and,
a second elastic damping element having a third diameter, the second elastic damping element arranged concentrically around the spacer bolt and axially adjacent to the stabilizing element on a second axial side;
wherein the first diameter is less than the second and third diameters.

* * * * *